(12) United States Patent
Sullivan et al.

(10) Patent No.: US 8,650,284 B2
(45) Date of Patent: Feb. 11, 2014

(54) USER ACTIVITY MONITORING

(75) Inventors: Blake Sullivan, Redwood City, CA (US); Pavitra Subramaniam, Alameda, CA (US)

(73) Assignee: Oracle International Corporation, Redwood Shores, CA (US)

( * ) Notice: Subject to any disclaimer, the term of this patent is extended or adjusted under 35 U.S.C. 154(b) by 488 days.

(21) Appl. No.: 13/037,074

(22) Filed: Feb. 28, 2011

(65) Prior Publication Data
US 2012/0221712 A1   Aug. 30, 2012

(51) Int. Cl.
*G06F 15/173* (2006.01)
*G06F 15/16* (2006.01)
*H04L 12/26* (2006.01)
*H04L 12/58* (2006.01)
*H04L 29/08* (2006.01)

(52) U.S. Cl.
CPC ............ *H04L 43/04* (2013.01); *H04L 12/5885* (2013.01); *H04L 67/142* (2013.01); *H04L 51/16* (2013.01)
USPC ............ 709/224; 709/230; 709/231; 709/232

(58) Field of Classification Search
CPC ... H04L 43/04; H04L 12/5885; H04L 67/142; H04L 51/16
USPC .......................................... 709/224, 207, 226
See application file for complete search history.

(56) References Cited

U.S. PATENT DOCUMENTS

| | | | |
|---|---|---|---|
| 6,993,590 B1 | 1/2006 | Gauthier et al. | |
| 2004/0098478 A1* | 5/2004 | Koetke et al. | 709/224 |
| 2006/0085420 A1 | 4/2006 | Hwang | |
| 2011/0238479 A1* | 9/2011 | Bova | 705/14.26 |

FOREIGN PATENT DOCUMENTS

| | | |
|---|---|---|
| WO | 00/75827 | 12/2000 |
| WO | 02/48899 | 6/2002 |

* cited by examiner

*Primary Examiner* — Karen Tang
(74) *Attorney, Agent, or Firm* — Fliesler Meyer LLP (57) ABSTRACT

Embodiments of the present invention include systems and methods for monitoring user activity. In embodiments, a front-end component collections data that may be useful to an administrator or others in determining or inferring what a user was doing or trying to do when interacting with an application, and the front-end component communicates at least some of this data to a back-end component. In embodiments, the communication of data related to the user activity is piggy-backed with typical transmissions, such as requests and responses, to reduce the overhead of the user activity monitoring.

15 Claims, 8 Drawing Sheets

USER ACTIVITY MONITORING

BACKGROUND

A. Technical Field

The present invention pertains generally to computer applications, and relates more particularly to monitoring a user's interactions with a computer application.

B. Background of the Invention

Development and maintenance of any product, including software applications, should involve monitoring an end user's interactions with the product. Being able to monitor a user's activity helps developers and administrators identify how users interact with the application and helps identify areas of improvement.

Previous attempts to monitor user interactions have been extremely limited. Querying users directly may be of some value; however, such methods are of limited appeal. First, it is difficult to get users to respond to surveys or to provide notification of issues. Second, users are likely not to pay close attention to the exact actions they are taking. Third, even if a company could get users to voluntarily submit user activity information, the users may not have useful information. The ubiquity of computers in modern society means that many with no technical ability use computers. These lay users will likely have no insight into their interactions with their computers. Traditionally, these end users have only two criteria by which they measure or monitor their interactions with an application—namely, how long does an interaction with the application take to complete and the availability of the same. Fourth, what is viewed by the user as a single interaction may involve a number of operations that can be shielded from the user. Thus, even if a user is willing to voluntarily track and submit his or her activity information and is technically proficient to be able to provide some meaningful information, the precise interaction problem may not be visible to them. Finally, such methods are delayed and not capable of being done in real-time.

Other attempts to monitor user activity include looking at data in user interactions. For example, the web sites that the user directs his or her browser to, or more particularly the Uniform Resource Locator (URL), can be examined to some degree to extract information. But, such methods, at best, provide only cursory information with little insight into the actual user intent.

Thus, previous attempts to provide meaningful information about what a user was intending to do when interacting with an application have been very limited or ineffectual.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, including software, hardware, or firmware, or combinations thereof. Accordingly, the figures described herein are illustrative of specific embodiments of the invention and are meant to avoid obscuring the invention.

Components, or modules, shown in block diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components or modules.

Furthermore, connections between components within the figures are not intended to be limited to direct connections. Rather, data between these components may be modified, re-formatted, or otherwise changed by intermediary components. Also, additional or fewer connections may be used. It shall also be noted that the terms "coupled" or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. The appearances of the phrases "in one embodiment," "in an embodiment," or "in embodiments" in various places in the specification are not necessarily all referring to the same embodiment or embodiments.

The use of certain terms in various places in the specification is for illustration and should not be construed as limiting. Usage of the term "service" or "function" is not limited to describing a single function; usage of the term also may refer to a grouping of related functions or functionality. Similarly, usage of the term "resource" is not limited to describing a single resource; the term also may be used to refer to a set of resources that may either be distributed or aggregated within a computing environment.

Embodiments of the present invention presented herein will be described using web applications examples. These examples are provided by way of illustration and not by way of limitation. One skilled in the art shall also recognize the general applicability of the present inventions to other applications.

A. General System Overview

Due to the ineffectual results of prior user interaction monitoring methods, what is needed are systems and methods by which semantic information about a user's interactions can be more directly determined or inferred. Thus, aspects of the current inventions involve capturing information that may be useful in determining or inferring what a user was trying to do when interacting with an application. An administrator seeks to monitor the health of a system as a whole, and the data collected regarding an individual user's interactions help the administrator with this task.

In order to facilitate this user activity monitoring, a rich client framework provides information about requests so that an administrator can monitor health of pages in an application, both historic and current. For example, user activity information includes a number of data elements, such as by way of illustration and not limitation, "click to render" time, event information, context identifier, region identifier, and others, for partial requests, streaming requests (e.g., data fetch in tables), and client-side redirect requests, and may be included with the information usually packaged in headers, response body, or URLs using special parameters. In embodiments, the performance metric "click-to-render" time includes all processing from the time the user performs an action on the browser (client start time) to the time the web application completes processing it and updates the browser with the results (client end time). In embodiments, an application can use this framework to monitor, such as by sniffing traffic between the client and the server, the interactions and extract the semantic information using the readily identifiable parameters. The extracted semantic information can then be used by the application and/or an administrator to monitor a user's interactions.

Figure 1:
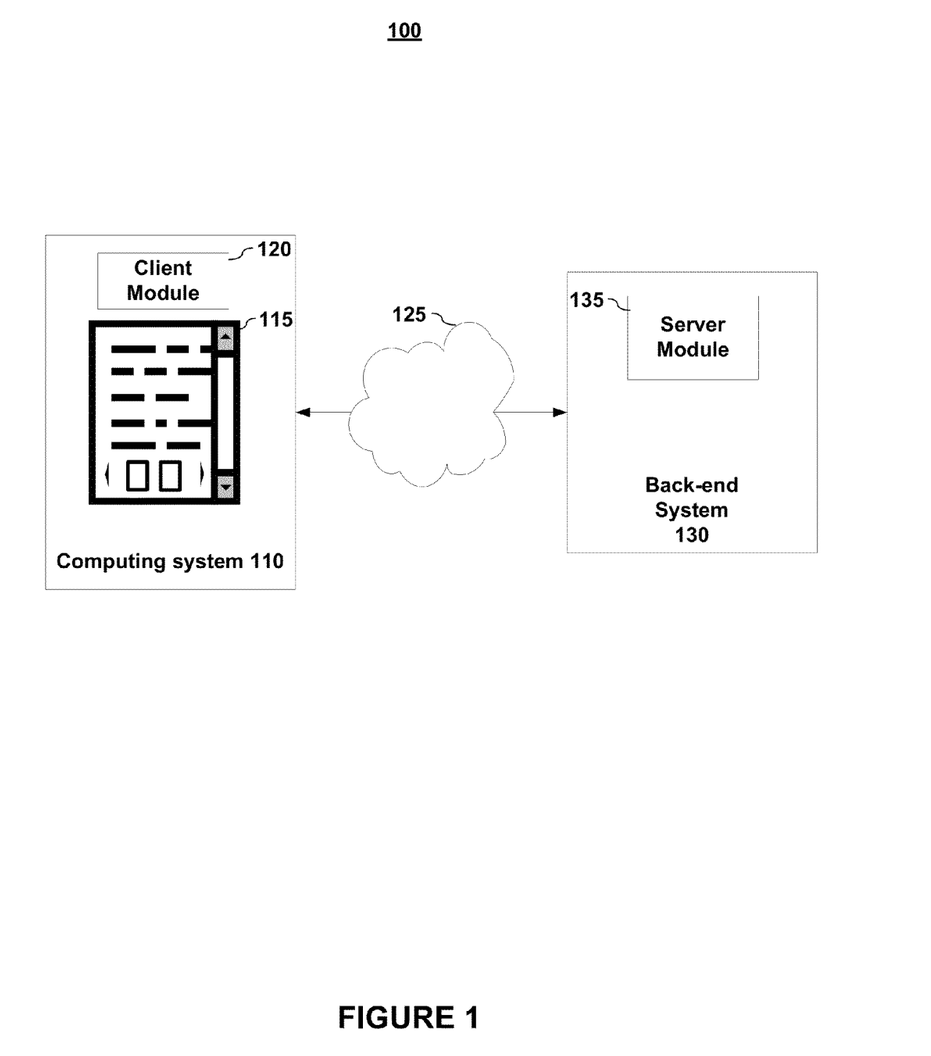
FIG. 1 graphically depicts an example of a system for user activity monitoring according to embodiments of the present invention.

FIG. 1 graphically depicts an example of an overall system 100 for user activity monitoring according to embodiments of the present invention. Illustrated in FIG. 1 is a client computing system 110 that is communicatively coupled via a network 125 to a back-end system 130. In embodiments, the computing device may be a desktop computer, laptop computer, mobile device, or any other device or set of devices with processing capabilities. The network 125 may be the Internet, an intranet, an extranet, a direct connection, or some combination thereof. In embodiments, the back-end system 130 may be part of the network 125. In embodiments, the back-end system 130 may be one or more servers, such as web servers. Back-end system 130 may be contained within a single device or may be distributed across a plurality of devices.

In embodiments, the system 100 includes two software components, modules, or applications. One module 120 operates at the front-end or client computing device 110, and the other module 135, the back-end or server module 135, operates at a back-end 130. In an embodiment, the front-end module 120 may be a plug-in or other module that works in conjunction with a client application, such as a browser 115. The client module 120 and the server module 130 help form a framework that allows an application extract data related to user activity in order to obtain user interaction information at the client and have those interactions linked with operations performed by the back-end system.

The client module 120 captures user activity information and communicates at least some of this information with the back-end 130. The server module 135 is also configured to communicate user activity monitoring related data with the client module 120.

In embodiments, the client module 120 sends this information by including it with typical transmissions. For example, the client module 120 may include user activity data with a request. Piggy-backing the user activity data with existing interactions or network activity helps reduce the overhead cost of the user monitoring activities. Also, to help reduce the overhead processing cost, the user activity may be included as one or more special parameters in the URL, in the header, in the body, or a combination thereof. By using special parameters, by selecting where to transmit the special parameters, or both, the overhead of extracting the user activity data can be dramatically reduced. Of course, one skilled in the art shall recognize that other implementations may be utilized. For example, if network traffic and/or processing usage are not significant concerns, the user activity data may be transmitted in separate network transmissions.

In embodiments, the information that may be available as part of the user activity monitoring data for a request may include, but is not limited to:

Context Identifier, which, in embodiments, is a string context identifier for a primary action or a secondary action;

Parent Context Identifier, which, in embodiments, is a context identifier of a parent (or primary) action for a secondary action;

Client Start Time, which, in embodiments, is the current start time of the client request. In embodiments, the Client Start Time is in UTC (Universal Coordinated Time) using the client's clock;

PPR (Partial Page Request) Target, which, in embodiments, is a list of component identifiers that have registered as partial targets on the client for a current request. These items represent components that may be changed or otherwise updated without requiring update or reload of the entire web page. A Partial Page Request is a request that results in a response that includes markup for only the parts of the page that need to change rather than the entire page. The client can specifically request that certain parts of the page be redrawn and the server may add additional portions as well;

Event Information, which, in embodiments, is information about an action, may include, but is not limited to, the following information:

Event Type, which, in embodiments, may be at a lower level (such as an action event representing that a button or a link was selected) or at a higher level (such as a pop-up window was displayed, rows were selected in a table, etc.);

Component Type. In embodiments, a server representation of a page has code associated with it to handle user interactions on the page (e.g., handling input into text fields, picking items to buy, etc). This is often modeled as a tree of user interface components. These components also generate the context displayed on the client, for example HTML and associated javascript. The client may also have a corresponding tree of user interface components in order to handle interactions on the client without needing to go back to the server. These components can be lower level encapsulations, like a button, or higher level encapsulations like the user interface representation of a shopping cart. In embodiments, it is these types of components that are recorded related to Component Type.

Component Client Id, which, in embodiments, is a client identifier of the component that is the source of the event. In embodiments, this uniquely identifies the instance of the component type, for example, which button was clicked.

Component Display Name, which, in embodiments, is a name that identifies of a component on a web page. For example, a button or link may be given an identifier by an application, but an administrator might not readily know what that identifier references. Thus, in embodiments, the client component assigns or at least attempts to assign a display name that is likely to be more meaningful to an administrator when trying to ascertain user activity (e.g., assigning "cancel" as a component display name, if the user-selected event was the result of a user clicking a "cancel" button). That is, a component display name is usually a human-readable name, which is displayed on the user interface, such as "Cancel" or something more meaningful such as "Cancel Subscription." An identifier uniquely identifies the component within the page, whereas a display name may not be unique. In embodiments, the identifier may provide contextual information about the component as well. In embodiments, the client applicant may send both the application-assigned component display identifier and its own component display name identifier.

Figure 2:
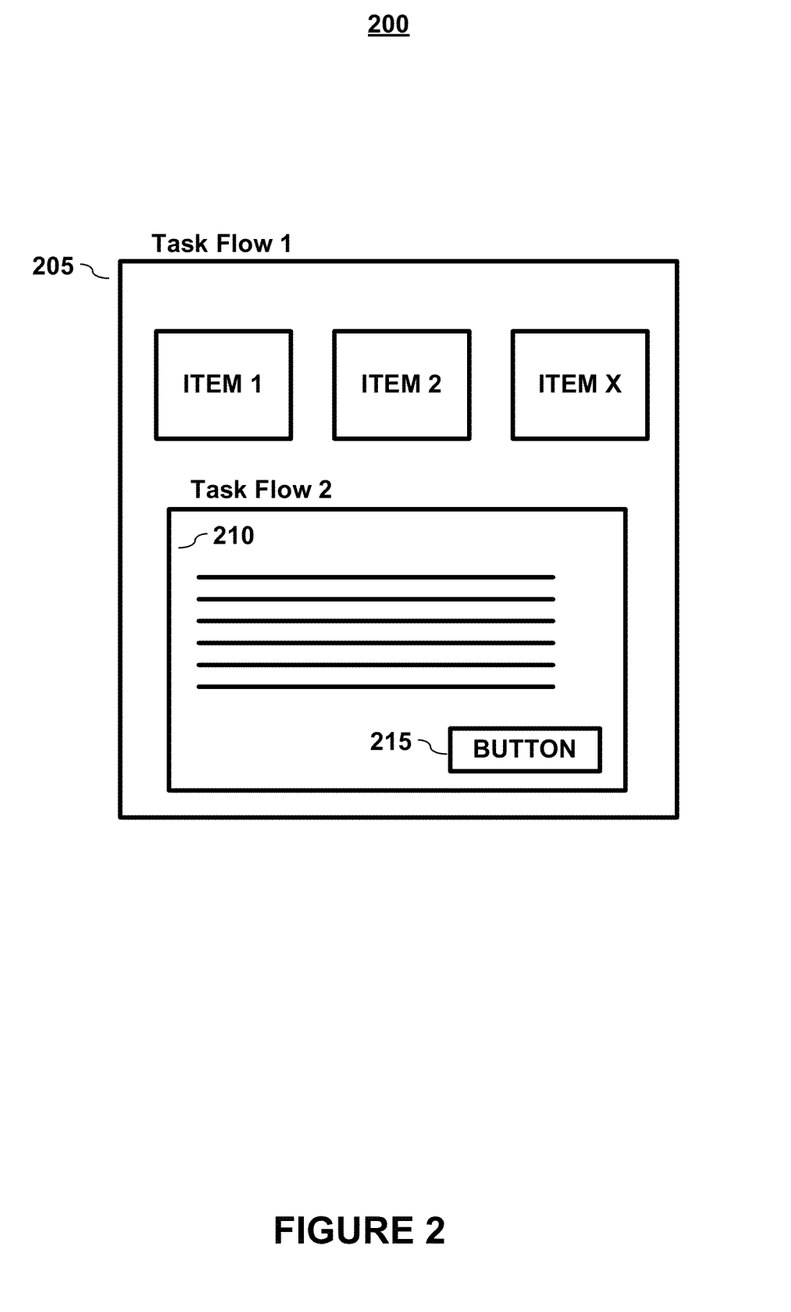
FIG. 2 depicts a set of nested task flows according to embodiments of the present invention.

Region Name, which, in embodiments, is a list of region names leading up to the outermost region, if the user action originated within the region. In embodiments, a web page may be divided into different regions and task flows. If an event originated in a defined region, that region name may be collected and used. If the region is nested within one or more other regions, the nesting information may also be collected. Consider, by way of illustration and not limitation, the example depicted in FIG. 2. FIG. 2 depicts a set of nested task flows 200 according to embodiments of the present invention. As shown in FIG. 2, a portion of a display of an application comprises a set of nested task flows that are presented in different regions in the display. In the depicted example, there is a component, in this case a button 215, that is within a region 210 of a task flow 2. The displayed region 210 of task flow 2 is nested within a larger region 205 that is associated with task flow 1. Thus, a region identifier may indicate this nested relationship. For example, a region identifier for a user event of the user selecting the button 215 may be "Task Flow 1: Task Flow 2: Button."

Region View Id is a list of region identifiers leading up to the outermost region, if the user action originated within the region. In embodiments, the region names are the names that identify the Task Flows globally, and are names that the administrator is likely familiar with and names that likely describe a higher level process (such as "Checkout"), while the region view identifiers are derived from the file names containing the definition of the regions (such as "checkout_credit_card.jsff").

In embodiments, for requests caused by a client attribute change, the "Event Info" may be set to "null."

In embodiments, the information that is available as part of the user activity monitoring data that may be included as part of a response or request may include, but is not limited to:

View Id, which, in embodiments, is an identifier of a view of the response page for the request that was just made;

Context Id, which, in embodiments, is a context identifier of a current request. In embodiments, a diagnostic and monitoring service operating at the back-end may generate an execution context identifier for the current request, which is used to associate logged activities performed for the request. In embodiments, this execution context identifier (ECID) may be used as the Context Id.

Secondary, which, in embodiments, is a parameter to identify that the request or response is a supplemental part of a prior, primary, user request. For example, a data streaming request is an example of a secondary request, which will generate a secondary response. A data streaming request typically occurs when the response for a primary request includes data rich components such as tables or trees. Often, the layout alone is part of the response for the primary request, and the data for these components are retrieved as part of a secondary streaming request. In embodiments, a boolean flag may be set to indicate that a response is associated with a previous primary request.

In embodiments, parameters, including but not limited to View-Id, Context-Id, and Secondary, are placed in the response header. Placing this information in the header make it less computationally expensive to extract than if placed in the response body, which can contain significant amounts of data. However, one skilled in the art shall recognize a number of ways in which data may be transmitted and extracted. Thus, one skilled in the art shall recognize that a back-end system may send one or more parameters related to user activity monitoring to the client as part of the response payloads, as part of the response header, in a separate communication, or some combination thereof. In embodiments, the interactions between the front-end and the back-end may be sniffed by a monitoring application to obtain the user activity monitoring related data.

B. Exemplary Method Embodiments

Figure 3:
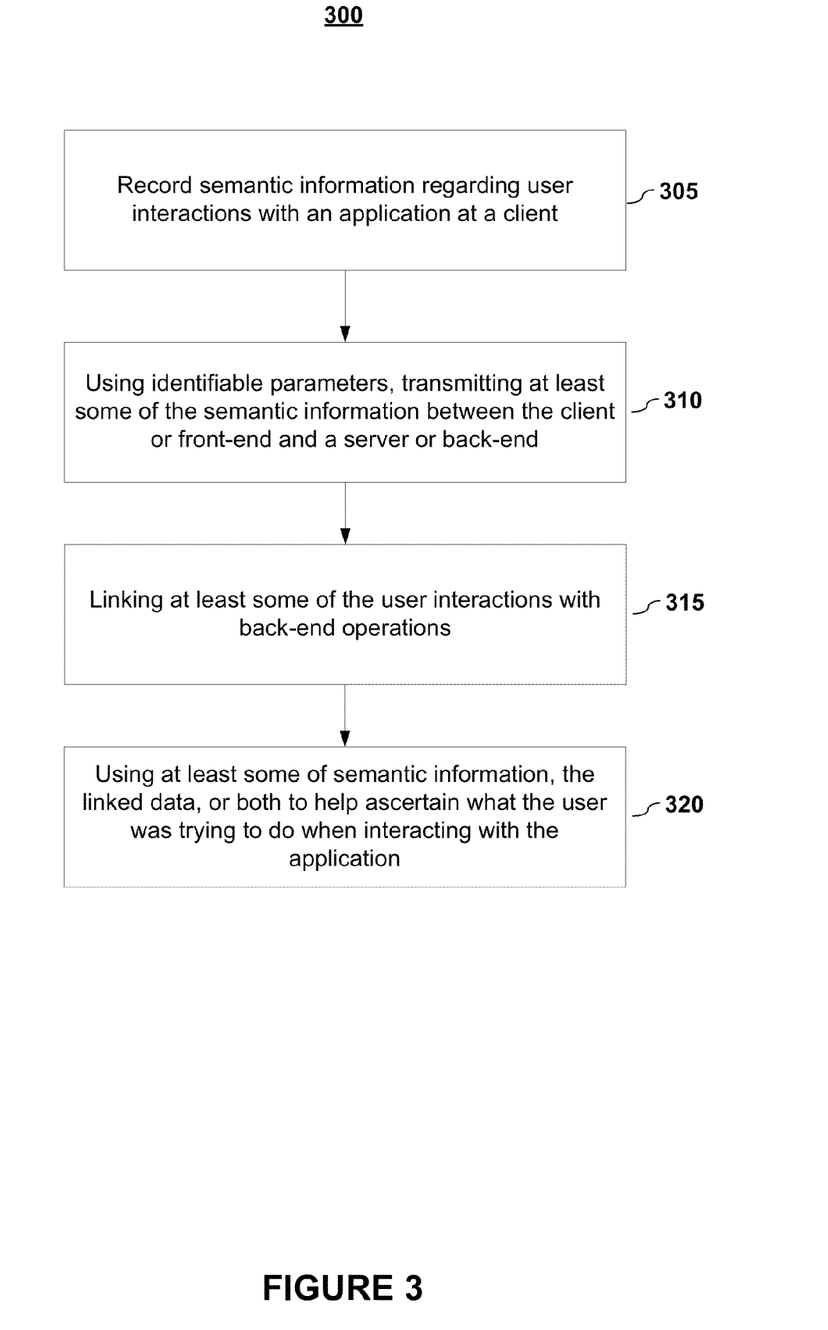
FIG. 3 depicts a method for user activity monitoring according to embodiments of the present invention.

FIG. 3 depicts an embodiment of a method for monitoring user activity according to embodiments of the present invention. In embodiments, semantic information regarding a user's interactions with an application is record (305) at the client. Semantic information shall be understood to mean information that can be used to determine or infer what a user was doing or attempting to do with respect to the application. To facilitate the passing of the semantic information between the client and the server, identifiable parameters are used (310) to transmit at least some of the semantic information between the client or front-end and a server or back-end. In embodiments, the special parameters may appear in a URL, in a header, in a body, or a combination thereof. Information logged about an operation or operations performed at the back-end can be linked (315) to the client request or requests that are received at the front-end. Having the semantic information about what the user is doing at the front-end and having the linked front-end and back-end operations can each be used to help ascertain (320) what the user was doing or trying to do when interacting with the application. In embodiments, an application can use this framework to monitor, such as by sniffing traffic between the client and the server, the interactions and extract the semantic information using the readily identifiable parameters. The extracted semantic information can then be used by the application and/or an administrator to monitor a user's interactions. In embodiments, this application may operate at the back-end.

Transmitting the semantic information about the user interface as well as the context identifier allows an analysis to be performed on at least two levels: 1) a quick analysis regarding what is going on based on the user-interface semantics (in embodiments, this analysis may be done in real time and may be aggregated together); and 2) a deeper analysis regarding what happened on a particular request-response (in embodiments, this analysis may be done by using the context identifier to tie the user interactions, quick analysis, or both back to the more in-depth information regarding what was going on at the back-end for the particular request-response). The typical workflow involves an administrator using the information in a quick analysis to identify possible problems in the running system and then using a deeper analysis to determine what actually happened and why.

Provided below are exemplary embodiments of methods related to user activity monitoring. The exemplary embodiments include implementation information, which is provided by way of example and not limitation. For example, it shall be noted some of the steps in the depicted and claimed methods may be altered or performed in different order without materially altering the invention. Accordingly, it shall be noted that implementation details are a matter of choice and that other implementations may be used. Thus, implementation details that are a matter of choice or that do not materially alter application of user activity monitoring shall not limit the scope of the present invention.

A. Partial Page Request Embodiments

Figure 4:
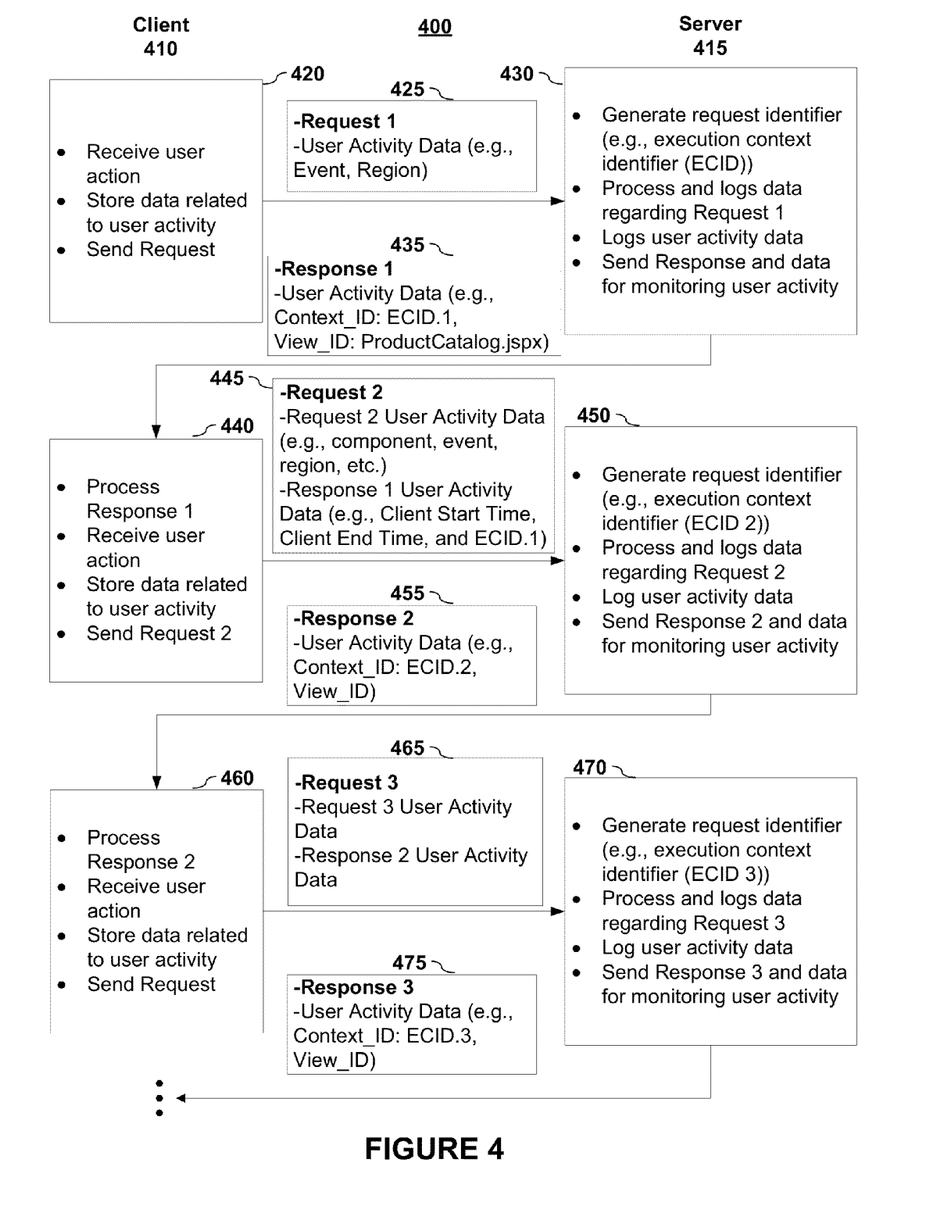
FIG. 4 depicts a method for user activity monitoring for a partial page request according to embodiments of the present invention.

FIG. 4 depicts a method for user activity monitoring for a partial page request according to embodiments of the present invention. In embodiments, a user initiates an action at the client or front-end. For example, the user may enter a URL into the application. In embodiments, the client-side module stores (420) data related to user activity on the first interaction. For example, if the initial action was the user selecting a link or button on a web page, the link or button identifier may be recorded, the event may be recorded, the region of the link or button may be recorded, and the like. Because the client start time of the user request may not be known for the first interaction, in embodiments, this information may be simulated or may be left blank/unknown. In embodiments, other user data may be collected and stored.

As shown in FIG. 4, a request is sent (420) from the client to the back-end 415. In embodiments, the request may include (425) with it some of the user activity data that was captured at the client 410. Alternatively, the user activity data for a current request may not be included with the request but may instead be sent partially with the current request and partially with the next request, only with the next request, or as one or more separate communications.

The back-end system 415 receives (430) the request from the front-end 410 and processes (430) the request. In embodiments, the back-end system generates a context identifier (e.g., an execution context identifier (ECID)), and activities performed in processing the request are logged and associated with that ECID. Having the activities logged and associated with the initiating request facilitates diagnostics and monitoring as well as facilitating logging user activity. Often, back-end application server may have a mechanism for generating request or context identifiers. Thus, in embodiments, the server component plug-in interface can utilize that identifier. It should be noted that to be able to use different context identifiers allows embodiments of the present invention to be abstracted from the specific application server implementation, thereby having great versatility. In embodiments, the back-end system 415 extracts the user activity data, associates it with the context identifier, and stores it. In embodiments, the server system does not perform extraction, storage, or analysis; rather, this information is simply published for one or more other applications or tools that monitor the network traffic to collect. Thus, embodiments of the present invention perform temporary data storage between the beginning of one request and the response but may not otherwise store or log data. In embodiments, the extracted and logged user activity data may include information for the current request, the previous request, or both.

Having processed the request, the back-end system returns (430) a response 435. In embodiments, the response includes the response payload for completing the requested action as well as additional user-activity-related data that can be useful for user monitoring. For example, in embodiments, the response may include in the response header the context identifier, which, in the depicted example, is ECID.1 and other data, such as a view identifier for the page that is updated. For example, if the user selected to view a product catalog as the request, the request URL may have a different identifier than the back-end identifier. Thus, in embodiments, the View ID, which is a back-end identifier for the view that the user sees, may be sent with the response as a special parameter. By way of illustration, the view identifier depicted in FIG. 4 for Response 1 may be "ProductCatalog.jspx."

The front-end system 410 receives and processes (440) the response from the back-end. In embodiments, the client side loads the page and the client end time for completing the requested action is noted. In embodiments, this information will be sent as part of the next request to the server. Alternatively, some or all of the information related to the first user request and response may not be collected or transmitted to the back-end.

The user interacts with the loaded page (e.g., clicks a button/link or changes an attribute), which creates the next request. For example, the next request may be an event, which is passed to the server to trigger a partial page response, or the next request may be an attribute change, which is passed to the server to trigger a partial refresh of the component. One skilled in the art shall recognize that a type of partial page request may be a partial page submit. When Request 2 is prepared to go to the server, the client module checks to see if there is any client-side user activity data that has been saved for the prior request. If so, it is included with that request, i.e., Request 2 in FIG. 4.

In embodiments, the user activity data that is piggy-backed with the request may be included in either the header or the body since the request is typically smaller than the responses, and they are typically in a format that is easy to parse, such as HTTP Post. Also, in embodiments, the special parameter that identifies end user monitoring information makes it easier to identify since the parser can look for that parameter in the body. In embodiments, the special parameter may be an XML document that contains various user activity information, such as, client start time, event user activated, region, etc.

In the depicted example of FIG. 4, the next request, Request 2, is sent (445) to the server and included with the request is user activity data. In embodiments, the user activity data is data related to the prior request-response (such as client start time of Request 1 (if known or simulated), client end time to complete the request-response, and the context identifier for that request-response). In embodiments, the user activity data may also include data for the current request (such as client start time of Request 2 and other event or component information that may be known). Note that in this depicted embodiment, the context identifier for Request 2 is not known because that identifier is assigned by the server. Also, the client end time for Request 2 will not yet be known because that request is currently on-going.

The server receives (450) this next request and repeats many of the steps as before. Namely, in embodiments, the back-end generates a context identifier (e.g., ECID 2), processes the request and logs data regarding the processing of the Request 2. In embodiments, the back-end 415 also extracts the user activity data from the request and logs that data. As noted previously, in embodiments, the server system may not perform extraction, storage, or analysis; but rather, this data is simply published for one or more other applications or tools that monitor the network traffic to collect. Having the user activity data associated with a unique context identifier allows the logged data to be linked together, which can provide greater insight in the interactions between the user and the overall system. That is, having the user activity data associated with a unique context identifier allows the logged data to be linked with more in-depth information logged by other back-end components to obtain a more comprehensive idea regarding what was occurring with respect to a particular request/response. In embodiments, the back-end also sends the response data (Response 2), which may include data used for monitoring user activity, such as the context identifier for Request and Response 2, view identifiers, and the like.

One skilled in the art shall recognize that these general process steps (e.g., steps 440 through 455) can be repeated for the various user interactions. For example, steps 460 through 475 repeat the same general conceptual steps of collecting and publishing user-activity-related data and facilitating communication between the back-end and the front-end to link the various activities.

One skilled in the art shall also recognize that in embodiments in which the user activity data is piggybacked with the next request, if there is not a next request, the data may be sent separately, sent before the application unloads, sent the next time the application loads, or not sent. One skilled in the art shall recognize that a number of ways exist for sending the data.

B. Obtaining Stored User-Activity-Related Data

Figure 5:
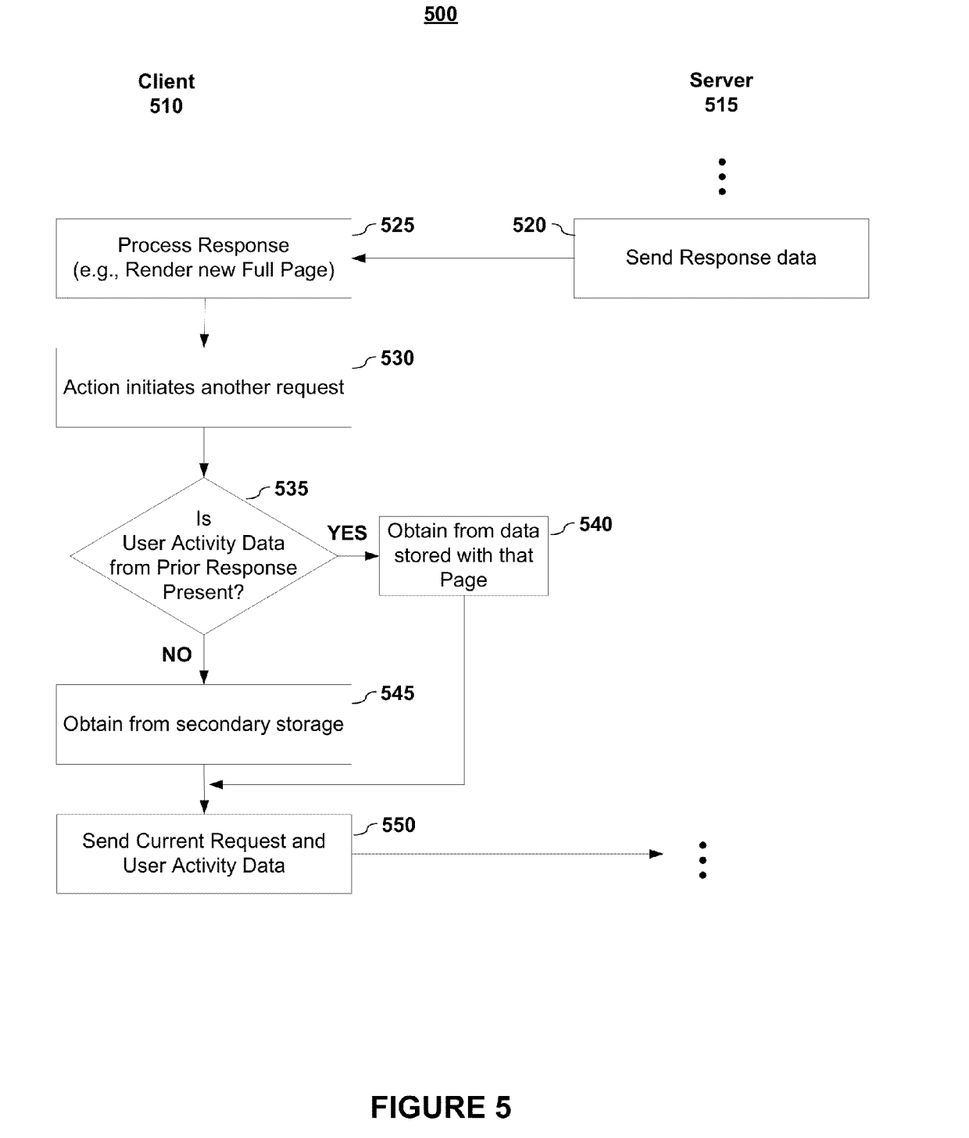
FIG. 5 depicts a method for obtaining stored user activity monitoring data according to embodiments of the present invention.

In embodiments, the user-activity-related data collected at the client side is stored as part of the web page. However, web applications can generate a variety of request and response interactions that can add complexity when trying to collect and communicate data related to user activity. For example, if the web browser gets redirected to a new page, any client-side information that was stored with the page is lost when the new page is rendered. To address such situations, the user-activity-related data may be stored and/or accessed from one or more secondary storages. FIG. 5 depicts a method for obtaining stored user activity monitoring data according to embodiments of the present invention.

For the purpose of illustration and not limitation, FIG. 5 represents a portion of interactions between a client 510 and a server 515, with an emphasis on obtaining data related to user activity according to embodiments of the present invention. Assume for the sake of illustration only that a response sent (520) from a server to the client results in the client rendering (525) a new full page. Because a new page is generated, user-activity-related data stored on the prior page is now lost. However, in embodiments, some of that user activity data, such as client end time of the prior request-response interaction, may be useful and should be communicated to the back-end for user activity monitoring. Thus, when the client system prepares to send the next request in response to an action, it checks (535) if there is user-activity-related data for a prior request-response interaction stored with that page. If the user-activity-related data from a prior request is stored with the web page, the client system uses (540) that data to send to the server. However, as in the example depicted here wherein a new page has been rendered, the current page is new and there is no such data stored.

Accordingly, in embodiments, the client system 510 obtains (545) the data from one or more secondary sources.

Thus, in embodiments, when storing user-activity-related data, the client may save the user-activity-related data with the web page and may also save it in one or more other locations. In embodiments, before rendering, the user-activity-related data is stored to a secondary storage. In addition to, or as alternatives, the client may obtain the data from secondary sources, such as without limitation, browser session storage, cookies, or global storage.

Having obtained the user-activity-related data (whether from the current page (540) or from one or more secondary sources (545)), the client sends the current request with user-activity-related data.

C. Special Requests and Responses

Figure 6:
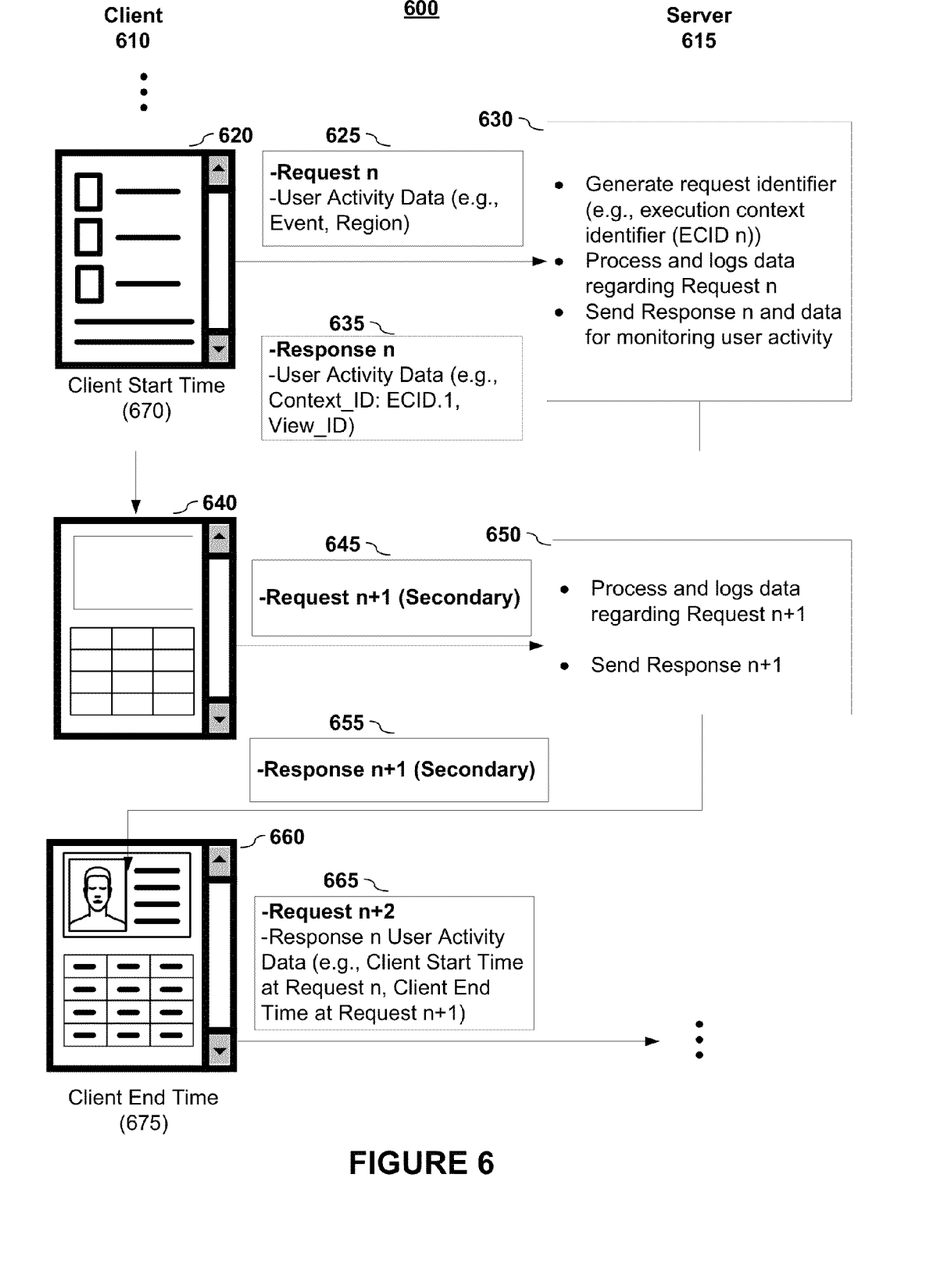
FIG. 6 depicts a method for user activity monitoring involving a secondary request according to embodiments of the present invention.
Figure 7:
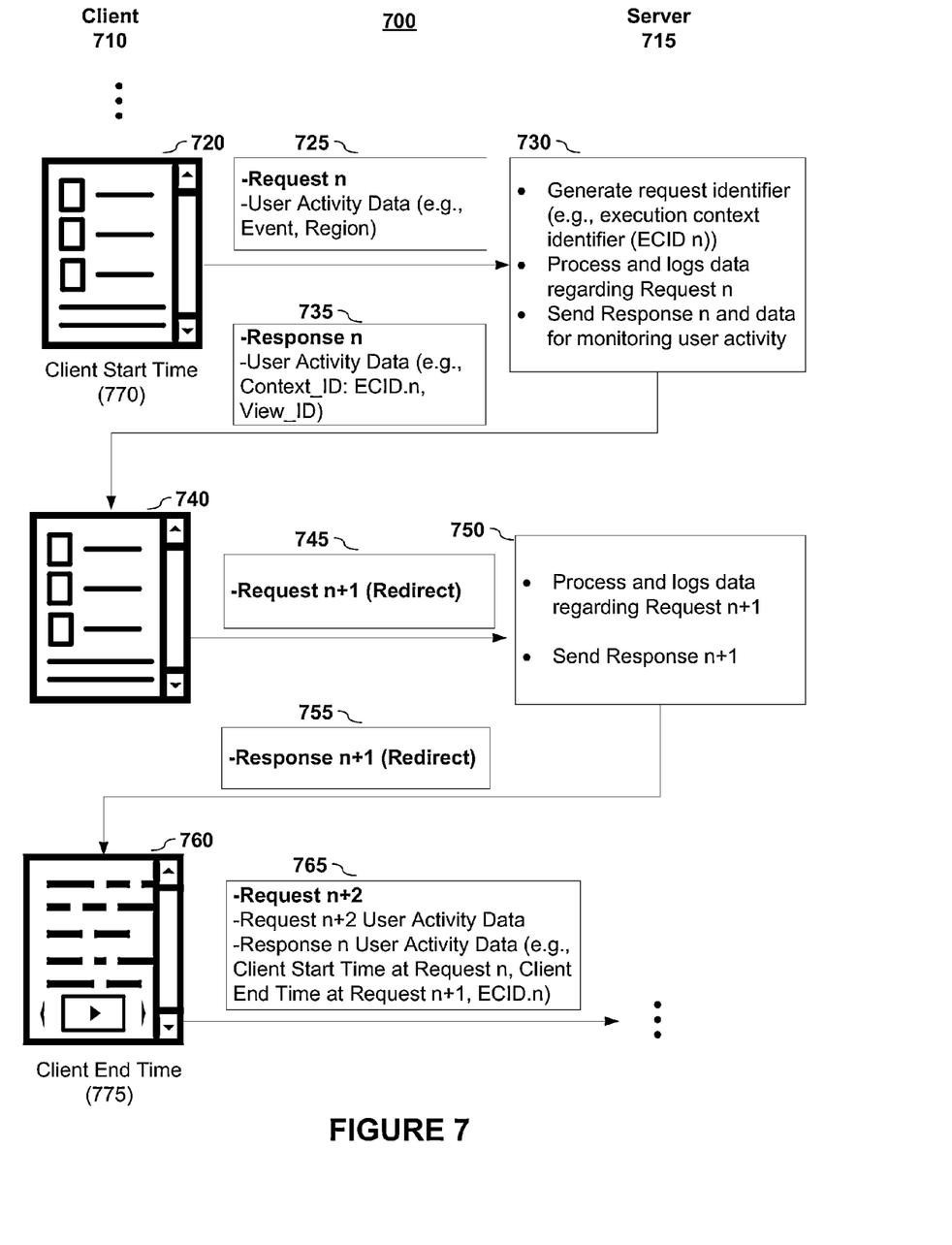
FIG. 7 depicts a method for user activity monitoring involving a client-side redirect according to embodiments of the present invention.

As noted in the last section, web applications can generate various request and response interactions that can add complexity when trying to collect and communicate user-activity-related data. There are instances in which a request is generated that is not a direct user action. Since one of the principal goals of embodiments of the present inventions is to gather data that may be used to determine or infer user activity or actions, it is beneficial to discount actions that are generated as a matter of technical interaction rather than user interaction. Two such examples are presented below with reference to FIG. 6 and FIG. 7. FIG. 6 depicts a method for user activity monitoring involving a secondary request, such as a data streaming case, according to embodiments of the present invention. FIG. 7 depicts a method for user activity monitoring involving a redirect request according to embodiments of the present invention.

1. Data Streaming

Data streaming interactions between a client and a server can result in additional requests and responses between the client and the server. To more accurately capture the true user activity, embodiments of the current invention compensate for such interactions. In embodiments, interactions that are part of a larger task are noted as secondary to the primary task. Consider, by way of illustration and not limitation, the example depicted in FIG. 6.

FIG. 6 depicts a method for user activity monitoring involving a secondary request according to embodiments of the present invention. A user is at a web page 620 that is displayed to him or her at the client 610. For purposes of illustration, assume that the user has selected an action on the page that results in a table being rendered. The request (Request n) is sent (625) to the back-end. User-activity-related data may be sent with the request. In embodiments, the user-activity-related data may include data about the prior request-response interaction (Request-Response n−1) and may include data about the current request (Request n).

The back-end system 615 receives (630) the request from the front-end 610 and processes (630) the request. In embodiments, the back-end system generates a context identifier (e.g., an execution context identifier (ECID)), and activities performed in processing the request are logged and associated with that ECID. In embodiments, the back-end system also extracts the user-activity-related data, using the special parameters to identify the data, and stores that data. As noted previously, in embodiments, the server system may not perform extraction, storage, or analysis. Rather, this information is simply published for one or more other applications or tools that monitor the network traffic to collect. The back-end system returns 635 a response. In embodiments, the response includes the response payload as well as additional user-activity-related data that may be useful for user monitoring.

The front-end system 610 receives and processes (640) the response from the back-end. In situations where there are one or more tables on the web page or other data streaming situations, when the response comes back to the client, it receives the layout of the page (e.g., display of 640). But, the data to populate the table or tables is fetched and loaded in one or more subsequent interactions. Thus, when the client system receives Response n, it automatically initiates (645) another request (Request n+1) to the server to obtain the data for the table. In embodiments, the client module understands it is a secondary request because the client in the code (e.g., Javascript code) initiated the action.

However, this request is secondary to the primary request. From the user's perspective, he or she asked to obtain a table with data and therefore considers the action complete when a table with data is displayed. Thus, in embodiments, the client system may include a special parameter that indicates that this request (Request n+1) is a secondary request. In embodiments, the special parameter indicating that it is a secondary request may be included in the request body or as part of the URL. The inclusion of the special parameter with the request allows an application that is sniffing the traffic to monitor user activity data to know that this request is a secondary request. Furthermore, since the initial request (Request n) has not yet been fulfilled, the client may not include any other user-activity-related data with this request (Request n+1).

The server receives and processes (650) the request. In embodiments, the server may assign a context identifier for the secondary request and log data associated with the processing of the request. After processing the request, the server prepares the response (Response n+1). In embodiments, the back-end systems understands that the request (Request n+1) is a streaming request, which makes it a secondary request, and adds (655) a special indicator to the response to indicate that it is a secondary response. In embodiments, if the context identifier for the secondary request-response interaction is included, an application monitoring user activity data can associate that context identifier with the primary context identifier.

The client receives (660) the secondary response and loads the data into the table or tables. In embodiments, the client end time is calculated as the end of the response that completes the user's request. In the depicted example, the client start time 670 was the start of the primary request (Request n) and the client end time 675 is the end of the secondary response (Response n+1), not the end of the initial response. One skilled in the art shall recognize that there can be a number of tables on a web page. In embodiments, the client end time is set when the last table is populated with data. Item 660 in FIG. 6 shows the web page with the tables populated with the data. In embodiments, the user-activity-related data, such as the client start time 670 and client end time 675, may be sent to the server as part of the next request (Request n+2) or as a separate communication. In embodiments, the user-activity-related data includes the context identifiers for the primary request (e.g., ECID.n), the secondary request (e.g., ECID.n+1), or both.

One skilled in the art shall also recognize that if multiple tables are present, in embodiments, end times for the individual tables may also be tracked. For example, the server can use separate threads for each table, and when data for a table has been gathered, it can be sent to the client. The client can keep track of which tables have not been completed and the server may do the same. When the data for all the tables has been sent, the server closes the connection and client knows it is done and can calculate the complete end time.

2. Client-Side Redirect

A client-side redirect presents a similar challenge to monitoring accurately user activity. Specifically, the client-side redirect also results in additional requests and responses between the client and the server that are not true user activity. To more accurately capture the true user activity, embodiments of the current invention compensate by noting the client-side redirects. Consider, by way of illustration and not limitation, the example depicted in FIG. 7.

FIG. 7 depicts a method for user activity monitoring involving a client-side redirect according to embodiments of the present invention. A user is at a web page 720 that is displayed to him or her at the client 710. A user-selected event results in a request (Request n) being sent (725) to the back-end 715. User-activity-related data may be sent with the request. In embodiments, the user-activity-related data may include data about the prior request-response interaction (Request-Response n−1) and may include data about the current request (Request n).

The back-end system 715 receives (730) the request and processes (730) it. In embodiments, the back-end system generates a context identifier (e.g., ECID) and activities performed in processing the request are logged and associated with that context identifier. In embodiments, the back-end system also extracts the user-activity-related data, using the special parameters to identify the data, and stores that data. In embodiments, the server system may not perform extraction, storage, or analysis, but rather, this information is simply published for one or more other applications or tools that monitor the network traffic to collect. The back-end system returns 735 a response. In embodiments, the response includes the response payload as well as additional user-activity-related data that may be useful for user monitoring.

The front-end system 710 receives and processes (740) the response from the back-end. For purposes of illustration, the response when processed at the client results in a redirect request (Request n+1) being sent (745). In embodiments, when the redirect response is processed on the client, the client saves any unreported user activity data and its associated ECID into secondary storage before initiating a redirect request (Request n+1). Like the data streaming case of the prior section, this request is secondary to the primary request. From the user's perspective, he or she will likely not consider the redirect a task separate from the initial request. Thus, in embodiments, the client system may include a special parameter that indicates that this request (Request n+1) is a secondary request. In embodiments, the special parameter indicating that it is a secondary request may be included in the request body or as part of the URL. The inclusion of the special parameter with the request allows an application that is sniffing the traffic to know that this request is a secondary request. Furthermore, in embodiments, since the initial request (Request n) has not yet been fulfilled, the client may not include any other user activity data with this request (Request n+1).

The server receives and processes (750) the request. In embodiments, the server may assign a context identifier for the redirect request and log data associated with the processing of the request. After processing the request, the server prepares the response (Response n+1). In embodiments, the back-end systems understands that the request (Request n+1) is a redirect request, which makes it a secondary request, and adds (755) a special indicator to the response to indicate that it is a secondary response. In embodiments, if the context identifier for the secondary request-response interaction is included, an application monitoring user activity data can associate that context identifier with the primary context identifier.

The client receives (760) the redirect response and loads the web page. One skilled in the art shall recognize that because the redirect resulted in a full page load, some of the user-activity-related data, such as the client start time 770, is obtained from a secondary source. Thus, in embodiments, the client retrieves the user-activity-related data that was stored in secondary storage, which is typically the ECID and client start time of request 725. In embodiments, the client end time is clocked after processing the response 755 that completes the user's request. In the depicted example, the client start time 770 was the start of the primary request (Request n) and the client end time 775 is the end of the secondary response (Response n+1), not the end of initial response. In embodiments, the user-activity-related data, such as the client start time 770 and client end time 775 may be sent to the server as part of the next request (Request n+2) or as a separate communication. In embodiments, the user-activity-related data includes the context identifiers for the primary request (e.g., ECID.n), the secondary request (e.g., ECID.n+1), or both.

D. Computing System Implementations

In embodiments, a computing system may be configured to perform one or more of the methods, functions, and/or operations presented herein. Systems that implement at least one or more of the methods, functions, and/or operations described herein may comprise a user activity monitor application or applications operating on a computer system. The computer system may comprise one or more computers and one or more databases.

It shall be noted that the present invention may be implemented in any instruction-execution/computing device or system capable of processing data, including, without limitation phones, laptop computers, desktop computers, and servers. The present invention may also be implemented into other computing devices and systems. Furthermore, aspects of the present invention may be implemented in a wide variety of ways including software, hardware, firmware, or combinations thereof. For example, the functions to practice various aspects of the present invention may be performed by components that are implemented in a wide variety of ways including discrete logic components, one or more application specific integrated circuits (ASICs), and/or program-controlled processors. It shall be noted that the manner in which these items are implemented is not critical to the present invention.

Figure 8:
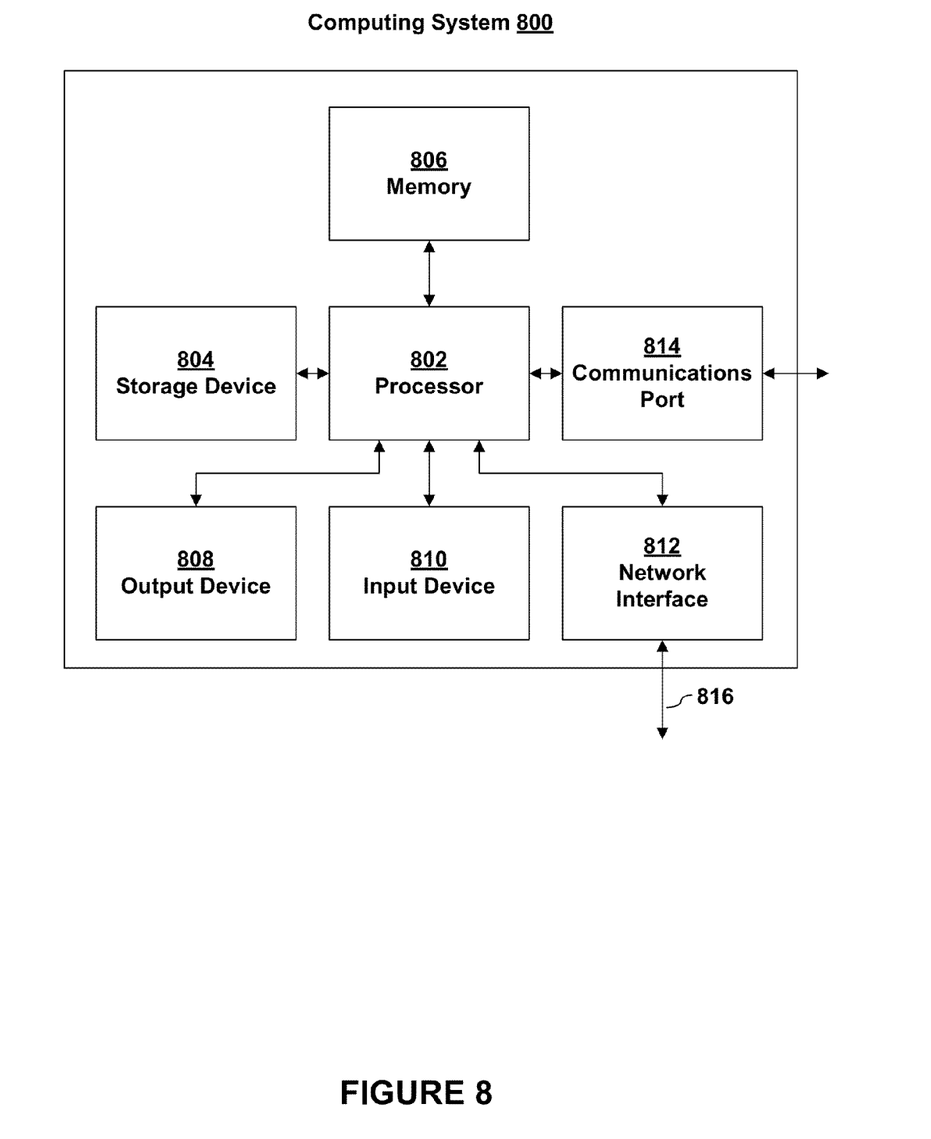
FIG. 8 depicts a block diagram of an example of a computing system according to embodiments of the present invention.

FIG. 8 depicts a functional block diagram of an embodiment of an instruction-execution/computing device 800 that may implement or embody embodiments of the present invention, including without limitation a client and a server. As illustrated in FIG. 8, a processor 802 executes software instructions and interacts with other system components. In an embodiment, processor 802 may be a general purpose processor such as (by way of example and not limitation) an AMD processor, an INTEL processor, a SUN MICROSYSTEMS processor, or a POWERPC compatible-CPU, or the processor may be an application specific processor or processors. A storage device 804, coupled to processor 802, provides long-term storage of data and software programs. Storage device 804 may be a hard disk drive and/or another device capable of storing data, such as a magnetic or optical media (e.g., diskettes, tapes, compact disk, DVD, and the like) drive or a solid-state memory device. Storage device 804 may hold programs, instructions, and/or data for use with processor 802. In an embodiment, programs or instructions stored on or loaded from storage device 804 may be loaded into memory 806 and executed by processor 802. In an embodiment, storage device 804 holds programs or instructions for implementing an operating system on processor 802. In one embodiment, possible operating systems include, but are not limited to, UNIX, AIX, LINUX, Microsoft Windows, and the Apple MAC OS. In embodiments, the operating system executes on, and controls the operation of, the computing system 800.

An addressable memory 806, coupled to processor 802, may be used to store data and software instructions to be executed by processor 802. Memory 806 may be, for example, firmware, read only memory (ROM), flash memory, non-volatile random access memory (NVRAM), random access memory (RAM), or any combination thereof. In one embodiment, memory 806 stores a number of software objects, otherwise known as services, utilities, components, or modules. One skilled in the art will also recognize that storage 804 and memory 806 may be the same items and function in both capacities. In an embodiment, one or more of the methods, functions, or operations discussed herein may be implemented as modules stored in memory 804, 806 and executed by processor 802.

In an embodiment, computing system 800 provides the ability to communicate with other devices, other networks, or both. Computing system 800 may include one or more network interfaces or adapters 812, 814 to communicatively couple computing system 800 to other networks and devices. For example, computing system 800 may include a network interface 812, a communications port 814, or both, each of which are communicatively coupled to processor 802, and which may be used to couple computing system 800 to other computer systems, networks, and devices.

In an embodiment, computing system 800 may include one or more output devices 808, coupled to processor 802, to facilitate displaying graphics and text. Output devices 808 may include, but are not limited to, a display, LCD screen, CRT monitor, printer, touch screen, or other device for displaying information. Computing system 800 may also include a graphics adapter (not shown) to assist in displaying information or images on output device 808.

One or more input devices 810, coupled to processor 802, may be used to facilitate user input. Input device 810 may include, but are not limited to, a pointing device, such as a mouse, trackball, or touchpad, and may also include a keyboard or keypad to input data or instructions into computing system 800.

In an embodiment, computing system 800 may receive input, whether through communications port 814, network interface 812, stored data in memory 804/806, or through an input device 810, from a scanner, copier, facsimile machine, or other computing device.

In embodiments, computing system 800 may include one or more databases, some of which may store data used and/or generated by programs or applications. In embodiments, one or more databases may be located on one or more storage devices 804 resident within a computing system 800. In alternate embodiments, one or more databases may be remote (i.e., not local to the computing system 800) and share a network 816 connection with the computing system 800 via its network interface 814. In various embodiments, a database may be a relational database, such as an Oracle database, that is adapted to store, update, and retrieve data in response to SQL-formatted commands.

One skilled in the art will recognize no computing system or programming language is critical to the practice of the present invention. One skilled in the art will also recognize that a number of the elements described above may be physically and/or functionally separated into sub-modules or combined together.

It shall be noted that embodiments of the present invention may further relate to computer products with a computer-readable medium that have computer code thereon for performing various computer-implemented operations. The media and computer code may be those specially designed and constructed for the purposes of the present invention, or they may be of the kind known or available to those having skill in the relevant arts. Examples of computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a computer. Examples of program modules include libraries, programs, routines, objects, components, and data structures. In distributed computing environments, program modules may be physically located in settings that are local, remote, or both.

It will be appreciated to those skilled in the art that the preceding examples and embodiment are exemplary and not limiting to the scope of the present invention. It is intended that all permutations, enhancements, equivalents, combinations, and improvements thereto that are apparent to those skilled in the art upon a reading of the specification and a study of the drawings are included within the true spirit and scope of the present invention.

What is claimed is:

1. A method for monitoring interactions between a user at a client system and a back-end system, comprising:
    receiving, at a back-end system, primary semantic information regarding an event directly initiated by a user at a client system, the event causing a primary request to be sent from a client application at the client system to a backend system, wherein the primary semantic information is passed to the back-end system using at least one special parameter included in the primary request, wherein a source of information used as the at least one special parameter is determined based on whether the primary semantic information is stored with a current page, wherein the information used as the at least one special parameter is selected from some of the primary semantic information or a secondary storage;
    extracting the primary semantic information using the at least one special parameter, wherein the primary semantic information is then linked, via a primary context identifier generated by the back-end system for the primary request, with one or more operations performed by the back-end system in processing the primary request;
    receiving a secondary request and secondary semantic information associated therewith, wherein the secondary request is automatically initiated by the client application in response to the back-end system processing the primary request;
    linking, via a secondary context identifier generated by the back-end system for the secondary request, the secondary semantic information with one or more additional operations performed by the back-end system in processing the secondary request, wherein the secondary context identifier is further linked to the primary context identifier; and
    monitoring interactions of the user with the back-end system by examining the semantic information and the associated operations, including identifying interactions directly initiated by the user using the primary context identifier.

2. The method of claim 1, wherein the primary semantic information comprises at least one of a start time an end time of the user-initiated event, event information, and one or more partial targets.

3. The method of claim 2, wherein the event information comprises at least one of an event type, a component type, a component client identifier, a component display name, a region name, and a region view identifier.

4. The method of claim 1, wherein the step of including the at least one special parameter with the primary request to the back-end system further comprises:
    responsive to determining that the primary semantic information is stored with a current web page, using at least some of the primary semantic information for the at least one special parameter; and
    responsive to determining that the primary semantic information is not stored with the current web page, using at least some of the semantic information stored in a secondary storage for the at least one special parameter.

5. The method of claim 1, wherein the secondary request includes an indicator that indicates the request is a secondary request.

6. A computer program product comprising at least one non-transitory computer-readable medium storing one or more sequences of instructions, wherein execution of the one or more sequences of instructions by one or more processors causes the one or more processors to perform steps comprising:
    receiving, at a back-end system, primary semantic information regarding an event directly initiated by a user at a client system, the event causing a primary request to be sent from a client application at the client system to a back-end system, wherein the primary semantic information is passed to the back-end system using at least one special parameter included in the primary request, wherein a source of information used as the at least one special parameter is determined based on whether the primary semantic information is stored with a current page, wherein the information used as the at least one special parameter is selected from some of the primary semantic information or a secondary storage;
    extracting the primary semantic information using the at least one special parameter, wherein the primary semantic information is then linked, via a primary context identifier generated by the back-end system for the primary request, with one or more operations performed by the back-end system in processing the primary request;
    receiving a secondary request and secondary semantic information associated therewith, wherein the secondary request is automatically initiated by the client application in response to the back-end system processing the primary request;
    linking, via a secondary context identifier generated by the back-end system for the secondary request, the secondary semantic information with one or more additional operations performed by the back-end system in processing the secondary request, wherein the secondary context identifier is further linked to the primary context identifier; and
    monitoring interactions of the user with the back-end system by examining the semantic information and the associated operations, including identifying interactions directly initiated by the user using the primary context identifier.

7. The computer program product of claim 6, wherein the data captured about the event comprises at least one of a client start time, a client end time, a partial target, an event type, a component type, a component client identifier, a component display name, a region name, and a region view identifier.

8. The computer program product of claim 6, wherein the at least one special parameter is included with a response from the back-end system to the primary request.

9. The computer program product of claim 6, wherein the step of including the at least one special parameter with the primary request to the back-end system further comprises:

responsive to determining that the primary semantic information is stored with a current web page, using at least some of the primary semantic information for the at least one special parameter; and responsive to determining that the primary semantic information is not stored with the current web page, using at least some of the semantic information stored in a secondary storage for the at least one special parameter.

10. The computer program product of claim 6, wherein the secondary request includes an indicator that indicates the request is a secondary request.

11. A system for monitoring interactions between a client application and a server application, the system comprising a physical storage memory and one or more hardware processors that execute a sequence of instructions to perform steps comprising:

receiving, at a back-end system, primary semantic information regarding an event directly initiated by a user at a client system, the event causing a primary request to be sent from a client application at the client system to a backend system, wherein the primary semantic information is passed to the back-end system using at least one special parameter included in the primary request, wherein a source of information used as the at least one special parameter is determined based on whether the primary semantic information is stored with a current page, wherein the information used as the at least one special parameter is selected from some of the primary semantic information or a secondary storage;

extracting the primary semantic information using the at least one special parameter, wherein the primary semantic information is then linked, via a primary context identifier generated by the back-end system for the primary request, with one or more operations performed by the back-end system in processing the primary request;

receiving a secondary request and secondary semantic information associated therewith, wherein the secondary request is automatically initiated by the client application in response to the back-end system processing the primary request;

linking, via a secondary context identifier generated by the back-end system for the secondary request, the secondary semantic information with one or more additional operations performed by the back-end system in processing the secondary request, wherein the secondary context identifier is further linked to the primary context identifier; and monitoring interactions of the user with the back-end system by examining the semantic information and the associated operations, including identifying interactions directly initiated by the user using the primary context identifier.

12. The system of claim 11, wherein the at least one special parameter is included with a response from the back-end system to the primary request.

13. The computer program product of claim 11, wherein the step of including the at least one special parameter with the primary request to the back-end system further comprises:

responsive to determining that the primary semantic information is stored with a current web page, using at least some of the primary semantic information for the at least one special parameter; and responsive to determining that the primary semantic information is not stored with the current web page, using at least some of the semantic information stored in a secondary storage for the at least one special parameter.

14. The computer program product of claim 11, wherein the secondary request includes an indicator that indicates the request is a secondary request.

15. The system of claim 11, wherein the data captured about the event comprises at least one of a client start time, a client end time, a partial target, an event type, a component type, a component client identifier, a component display name, a region name, and a region view identifier.

\* \* \* \* \*

UNITED STATES PATENT AND TRADEMARK OFFICE
CERTIFICATE OF CORRECTION

PATENT NO. : 8,650,284 B2  
APPLICATION NO. : 13/037074  
DATED : February 11, 2014  
INVENTOR(S) : Sullivan et al.

Page 1 of 1

It is certified that error appears in the above-identified patent and that said Letters Patent is hereby corrected as shown below:

In the Specification

In column 8, line 67, Delete "ECID 2)," and insert -- ECID.2), --, therefor.

In the Claims

In column 15, line 41, in Claim 1, delete "backend" and insert -- back-end --, therefor.

In column 16, line 7, in Claim 2, delete "start time" and insert -- start time, --, therefor.

In column 17, line 35, in Claim 11, delete "backend" and insert -- back-end --, therefor.

In column 18, line 25, in Claim 13, delete "11 ," and insert -- 11, --, therefor.

In Column 18, line 25, in Claim 13, delete "The computer program product" and insert -- The system --, therefor.

In Column 18, line 37, in Claim 14, delete "The computer program product" and insert -- The system --, therefor.

Signed and Sealed this  
Thirtieth Day of June, 2015

Michelle K. Lee  
*Director of the United States Patent and Trademark Office*